United States Patent
Sim

(10) Patent No.: US 6,771,219 B2
(45) Date of Patent: Aug. 3, 2004

(54) ADAPTIVE BEAMFORMING METHOD FOR SMART ANTENNA SYSTEM

(75) Inventor: Dong-Hi Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/320,669

(22) Filed: Dec. 17, 2002

(65) Prior Publication Data

US 2003/0128160 A1 Jul. 10, 2003

(30) Foreign Application Priority Data

Dec. 18, 2001 (KR) .................................. 10-2001-0080753

(51) Int. Cl.[7] .............................. G01S 3/16; H01Q 3/26; H04B 1/06; H04B 7/00
(52) U.S. Cl. ........................ 342/382; 342/372; 342/378; 455/276.1
(58) Field of Search ................................. 342/368–384; 375/347, 349; 455/65, 101–105, 132–141, 272–279.1

(56) References Cited

U.S. PATENT DOCUMENTS 6,462,709 B1 * 10/2002 Choi ........................... 342/378
6,587,451 B1 * 7/2003 Kwon et al. ............. 455/276.1

FOREIGN PATENT DOCUMENTS

WO   WO 00/38276 A1 * 6/2000 .......... H01Q/21/06

* cited by examiner

*Primary Examiner*—Thomas H. Tarcza
*Assistant Examiner*—F H Mull
(74) *Attorney, Agent, or Firm*—Fleshner & Kim, LLP

(57) ABSTRACT

An adaptive beamforming method for an antenna array is provided in which an array output is calculated based on a weight vector $\underline{w}$, which is determined from an eigenvector corresponding to a maximum eigenvalue $\lambda$ of a generalized eigenvalue problem consisting of autocovariance matrices $\underline{R}_{xx}$ and $\underline{R}_{yy}$ of received signal vectors $\underline{y}$ and $\underline{x}$, respectively. The present invention dramatically decreases the total computation requirements by omitting complex matrix operations from the weight vector calculation, thereby making it possible to reduce the weight vector calculation time so as to form the beam pattern for the array antenna system in real time.

25 Claims, 3 Drawing Sheets

ADAPTIVE BEAMFORMING METHOD FOR SMART ANTENNA SYSTEM

BACKGROUND OF THE INVENTION

1. Field of the Invention

The present invention relates to a smart antenna system and, in particular, to an improved adaptive beamforming method for an antenna array in a Code Division Multiple Access (CDMA) communication system.

2. Background of the Related Art

In wireless communication systems, various diverse methods are used for increasing the coverage area and capacity of the system.

Rake receiver architecture provides an effective immunity to the inter-symbol interference (ISI) in multipath propagation environments, which cause the same signal to be repeatedly received at an antenna at a plurality of different time intervals.

Recently, directive antennas have been employed to increase the signal-to-interference plus noise ratio (SINR) by increasing the energy radiated to a desired mobile terminal, while simultaneously reducing the interference energy radiated to other remote mobile terminals. Such reduction in the interference energy radiated to mobile terminals can be achieved by generating spatially selective, directive transmission beam patterns.

One directive antenna technique is adaptive beamforming, in which the beam pattern produced by beamforming antenna arrays of the base station adapts in response to changing multipath conditions. In such beamforming arrays, weight vectors are used to generate on antenna beam pattern that maximizes signal energy transmitted to and received from an intended mobile terminal.

There are a number of algorithms presently in use for calculating the weight vectors. These algorithms rely on adjusting the weight vector so as to track the more slowly changing components of the received signal and assume that more rapidly changing random signal components are removed by integration and are hence not tracked.

These algorithms update the weight vector based on a generalized eigenvalue problem, and the generalized eigenvalue problem is converted so as to be an ordinary eigenvalue problem. Continuously, a positive definite matrix is taken among two matrixes consisting of the generalized eigenvalue problem, and the positive definite matrix is written with two matrixes such that an inverse matrix should be obtained from one of the two written matrixes.

However, the conventional algorithms have a drawback in that the weight vector calculation is so complicated and time-consuming that it is not appropriate for an array antenna system that requires real time environment adaptation.

SUMMARY OF THE INVENTION

An object of the invention is to solve at least the above problems and/or disadvantages and to provide at least the advantages described hereinafter.

It is an object of the present invention to provide an adaptive beamforming method capable of reducing total computational load for computing weight vector.

It is another object of the present invention to provide an adaptive beamforming method capable of maximizing the Signal to Interference plus Noise (SINR).

To achieve the above objects, the adaptive beamforming method of the present invention comprises the steps of setting an initial weight vector w; updating present autocovariance matrixes $\underline{\underline{R}}_{xx}$ and $\underline{\underline{R}}_{yy}$ of the generalized eigenvalue problem with the signal vectors $\underline{y}$ and $\underline{x}$ at a present snapshot; obtaining diagonal and off-diagonal matrixes of one of the autocovariance matrixes $\underline{\underline{R}}_{xx}$ and $\underline{\underline{R}}_{yy}$; computing the maximum eigenvalue $\lambda$ using the weight vector $\underline{w}$, the autocovariance matrixes $\underline{\underline{R}}_{xx}$ and $\underline{\underline{R}}_{yy}$ at the present snapshot, and the diagonal and off-diagonal matrixes; and updating the weight vector using the present weight vector $\underline{w}$, the eigenvalue $\lambda$, and autocovariance matrixes $\underline{\underline{R}}_{xx}$ and $\underline{\underline{R}}_{yy}$.

The diagonal matrix is a matrix whose diagonal elements are identical to diagonal elements of a square matrix and whose off-diagonal elements are zero, and the off-diagonal matrix is a matrix whose diagonal elements are zero and whose off-diagonal elements are identical to off-diagonal elements of the square matrix.

In one aspect of the present invention, the diagonal and off-diagonal matrixes are $\underline{\underline{R}}_{xx}^D$ and $\underline{\underline{R}}_{xx}^O$ derived from the autocovariance matrix $\underline{\underline{R}}_{xx}$.

The maximum eigenvalue $\lambda$ is calculated in accordance with the following equation:

$$\lambda = \frac{\underline{w}^H \underline{\underline{R}}_{yy} \underline{w}}{\underline{w}^H \underline{\underline{R}}_{xx} \underline{w}}$$

where H is the Hermitian operator.

The weight vector $\underline{w}$ is updated in accordance with the following equation:

$$\underline{w}(k+1) = \frac{\left[\underline{\underline{R}}_{yy}(k)\left(\underline{\underline{R}}_{xx}^D(k)\right)^{-1} - \lambda \underline{\underline{R}}_{xx}^O(k)\left(\underline{\underline{R}}_{xx}^D(k)\right)^{-1}\right]\underline{w}(k)}{\lambda}$$

where k is a snapshot index for receiving the signal vector and for updating the weight vector.

The maximum eigenvalue $\lambda(k)$ at the present snapshot is computed in accordance with the following equation:

$$\lambda(k) = \frac{\lambda_{nom}(k)}{\lambda_{den}(k)}$$

where nom denotes numerator and den denotes denominator, $\lambda_{nom}(k) = f\lambda_{nom}(k-1) + |\alpha(k)|^2$, and $\lambda_{den}(k) = f\lambda_{den}(k-1) + |\beta(k)|^2$.

$\alpha(k)$ is obtained in accordance with $\alpha(k) = \underline{y}^H(k)\underline{w}(k)$, and $\beta(k)$ is obtained in accordance with $\beta(k) = \underline{x}^H(k)\underline{w}(k)$.

The weight vector is updated in accordance with the following equation:

$$\underline{w}(k+1) = \underline{w}(k) + \underline{\varrho}(k),$$

where $$\underline{\varrho}(k) = \left[\underline{\underline{R}}_{xx}^D(k)\right]^{-1}\left[\frac{1}{\lambda(k)}\underline{v}(k) - \underline{q}(k)\right].$$

$\underline{v}(k)$ is obtained in accordance with the following equation:

$$\underline{v}(k) = f\underline{\underline{R}}_{yy}(k-1)\underline{w}(k) + \underline{y}(k) + \underline{y}^H(k)\underline{w}(k)$$
$$\approx f\underline{\underline{R}}_{yy}(k-1)\underline{w}(k-1) + \underline{y}(k)\underline{y}^H(k)\underline{w}(k).$$
$$\approx f\underline{v}(k-1) + \alpha(k)\underline{y}(k).$$

$\underline{q}(k)$ is obtained in accordance with the following equation:

$$\underline{q}(k) = f\underline{\underline{R}}_{xx}(k-1)\underline{w}(k) + \underline{x}(k)\underline{x}^H(k)\underline{w}(k).$$
$$\approx f\underline{q}(k-1) + \beta(k)\underline{x}(k).$$

In another aspect of the present invention, the diagonal and off-diagonal matrixes are $\underline{\underline{R}}_{yy}^D$ and $\underline{\underline{R}}_{yy}^O$ derived from the autocovariance matrix $\underline{\underline{R}}_{yy}$.

The maximum eigenvalue $\lambda$ is calculated in accordance with the following equation:

$$\lambda = \frac{\underline{w}^H \underline{\underline{R}}_{yy} \underline{w}}{\underline{w}^H \underline{\underline{R}}_{xx} \underline{w}}$$

where H is the Hermitian operator.

The weight vector $\underline{w}$ is updated in accordance with the following equation:

$$\underline{w}(k+1) = \underline{w}(k) + \underline{p}(k)$$

where $\underline{p}(k) = [\underline{\underline{R}}_{yy}^D(k)]^{-1}[\lambda(k)\underline{\gamma}(k) - \underline{\eta}(k)]$.

$\underline{\gamma}(k)$ is obtained in accordance with the following equation:

$$\underline{\gamma}(k) = f\underline{\underline{R}}_{xx}(k-1)\underline{w}(k) + \underline{x}(k)\underline{x}^H(k)\underline{w}(k)$$
$$\approx f\underline{\gamma}(k-1) + \beta(k)\underline{x}(k)$$

where $\beta(k) = \underline{x}^H(k)\underline{w}(k)$.

$\underline{\eta}(k)$ is obtained in accordance with the following equation:

$$\underline{\eta}(k) = f\underline{\underline{R}}_{yy}(k-1)\underline{w}(k) + \underline{y}(k)\underline{y}^H(k)\underline{w}(k)$$
$$\approx f\underline{\eta}(k-1) + \alpha(k)\underline{y}(k)$$

where $\alpha(k) = \underline{y}^H(k)\underline{w}(k)$.

To achieve at least the above objects, in whole or in part, there, is provided a method for updating a weight factor for input signals from a plurality of antennas of a wireless communication system, including setting an initial weight vector for weighting the input signals, separating desired signals from the input signals, obtaining auto-covariance matrixes of the separated desired signals and the input signals, respectively, computing an eigenvalue that maximizes a ratio of a vector that is a multiplication of the auto-covariance matrix of the separated desired signals and the initial weight vector over a vector that is a multiplication of the auto-covariance matrix of the input signals and the initial weight vector, generating a new weight vector by adding a vector to the initial weight vector, wherein said added vector is proportional to the multiplication of the inverse of a diagonal matrix of the auto-covariance matrix of the input signals and a vector made from the multiplication of a vector of the separated signals and the initial weight vector and the inverse of the eigenvalue.

To achieve at least these advantages, in whole or in part, there is further provided a method for updating a weight factor for input signals from a plurality of antennas of a wireless communication system, including setting an initial weight vector for weighting the input signals, separating desired signals from the input signals, obtaining auto-covariance matrixes of the separated desired signals and the input signals, respectively, computing an eigenvalue that maximizes a ratio of a vector that is a multiplication of the auto-covariance matrix of the separated desired signals and the initial weight vector over a vector that is a multiplication of the auto-covariance matrix of the input signals and the initial weight vector, generating a new weight vector by adding a vector to the initial weight vector, wherein said added vector is proportional to the multiplication of the inverse of a diagonal matrix of the auto-covariance matrix of the separated desired signals and a vector made from the multiplication of a vector of the input signals and the initial weight vector and the eigenvalue.

To achieve at least these advantages, in whole or in part, there is further provided a method for updating a maximum eigenvalue for generating a weight factor for weighting the signals from a plurality of antennas of a wireless communication system, including setting an initial weight vector for weighting the input signals, separating desired signals from the input signals, generating a first value by multiplying the Hermitian of a vector of the separated desired signals and the weight vector, generating a second value by multiplying the Hermitian of a vector of the input signals, computing a numerator of a new maximum eigenvalue by adding a square of said first value to a portion of a numerator of a previous maximum eigenvalue, computing a denominator of the new maximum eigenvalue by adding a square of said second value to a portion of a denominator of the previous maximum eigenvalue; and replacing the previous maximum eigenvalue with the new maximum eigenvalue having said numerator and denominator.

To achieve at least these advantages, in whole or in part, there is further provided an adaptive beam forming method for a communication receiver that inputs signals from an antenna array, including separating desired signals from the input signals, calculating a maximum eigenvalue by defining it as a portion of a numerator and a portion of a denominator, calculating a weight vector using said maximum eigenvalue, said desired signals, and said input signals, and weighting signals from or to a plurality antennas in said antenna array with the weight vector.

To achieve at least these advantages, in whole or in part, there is further provided a method of obtaining a maximum eigenvalue for deriving a weight vector for weighting input signals from a plurality of antennas, including separating desired signals from the input signals, setting an initial weight vector for weighting the input signals, generating a first value based on a Hermitian of a vector of the separated desired signals, generating a second value based on a Hermitian of a vector of the input signals, and deriving the maximum eigenvalue from the first and second values.

To achieve at least these advantages, in whole or in part, there is further provided a method of updating a weight vector for weighting input signals from a plurality of antennas, including setting an initial weight vector for weighting the input signals, separating desired signals from the input signals, deriving an auto-covariance matrix of the separated desired signals, deriving an auto-covariance matrix of the input signals, deriving a maximum eigenvalue using the auto-covariance matrix of the separated desired signals, the auto-covariance matrix of the input signals and the initial weight vector; and deriving a new weight vector by adding a vector to the initial weight vector, wherein the added vector is based on a vector of the separated signals, a vector of the input signals, the initial weight vector, the maximum eigenvalue, and one of the auto-covariance matrix of the input signals and the auto-covariance matrix of the separated desired signals.

To achieve at least these advantages, in whole or in part, there is further provided an adaptive beam forming method, including receiving input signals from a plurality of antennas, separating desired signals from the input signals, setting an initial weight vector for weighting the input signals, generating a first value based on a Hermitian of a vector of the separated desired signals, generating a second value based on a Hermitian of a vector of the input signals, and deriving the maximum eigenvalue from the first and second values, deriving a weight vector using the separated desired signals, the input signals and the derived maximum eigenvalue, and applying the weight vector to the input signals or to signals being sent to the plurality of antennas.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Preferred embodiments of the present invention will be described hereinafter with reference to the accompanying drawings.

First Preferred Embodiment

Figure 1:
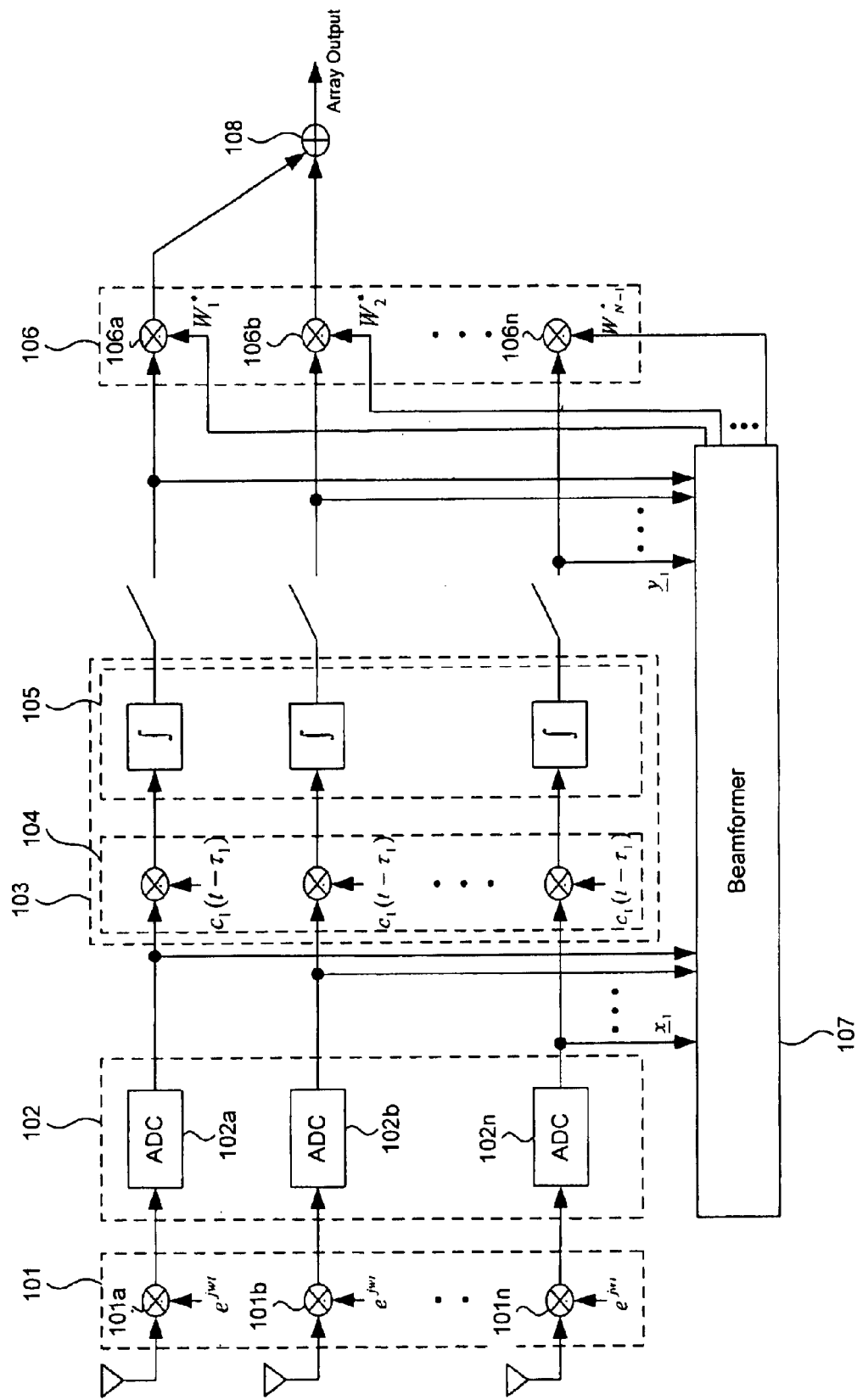
FIG. 1 is a block diagram illustrating a beamforming apparatus for an array antenna system, in accordance with the present invention.

FIG. 1 is a schematic block diagram illustrating a general beamforming apparatus for an array antenna system.

As shown in FIG. 1, the array antenna system includes a down converter unit 101, analog-digital converter unit (ADC) 102, a despreading unit 103 having a first multiplication unit 104 and an integration unit 105, a second multiplier unit 106, a beamformer 107, an array output unit 108.

High frequency signals received through respective antennas (ANT) are processed through respective demodulation processes. The signal received from each antenna (ANT) is down-converted into baseband signals by a respective down converter, e.g., down converter 101a, of the down converter unit 101. The down-converted baseband signal is sent to a respective ADC, e.g., ADC 102a, of the ADC unit 102 so as to be converted into a digital signal. The digital signal is despreaded by the despreading unit 103 and then the output signal from the despreading unit 103 is multiplied by a weight vector $\underline{w}$ produced by the beamformer 107 at a respective multiplier, e.g., multiplier 106a, of the second multiplier unit 106. Consequently, the respective output signals of the multipliers 106a of the second multiplier 106 are summed by the array output unit 108 such that the output signal of the array output unit 108 is provided to a demodulator (not shown).

The beamformer 107 calculates the weight vector $\underline{w}$ using the signals obtained at the output and input of the despreading unit 103, respectively. Note that the input signal includes the interferences and noise, as well as the desired signal. The interferences and noise, as undesired signals, are removed through the multiplication and integration procedure at the first multiplication unit 104 and the integration unit 105.

As described above, the beamformer 106 uses the high frequency signal $\underline{x}$ before despreading and the baseband signal $\underline{y}$ that is despreaded by multiplying by a canalization code that is known to the receiving end and that has undergone noise removal by integration. The beamformer 106 calculates the weight vector $\underline{w}$ using autocovariance matrixes obtained from the pre-despread signal $\underline{x}$ and post-despread signal $\underline{y}$.

The weight vector $\underline{w}$ can be found from the eigenvector corresponding to the largest eigenvalue of the following generalized eigenvalue problem:

$$\underline{\underline{R}}_{yy}\underline{w}=\lambda \underline{\underline{R}}_{xx}\underline{w} \qquad (1)$$

where $\underline{\underline{R}}_{yy}$ and $\underline{\underline{R}}_{xx}$ are the autocovariance matrixes of the received signals $\underline{y}$ and $\underline{x}$, respectively, with $\underline{y}$ and $\underline{x}$ being the column vectors of the received signals obtained at the output and input of the despreading unit 103, respectively.

The autocovariance matrixes $\underline{\underline{R}}_{xx}$ and $\underline{\underline{R}}_{yy}$ are estimated in accordance with the following equations:

$$\underline{\underline{R}}_{xx}(k)=f\underline{\underline{R}}_{xx}(k-1)+\underline{x}(k)\underline{x}^{H}(k) \qquad (2)$$

$$\underline{\underline{R}}_{yy}(k)=f\underline{\underline{R}}_{yy}(k-1)+\underline{y}(k)\underline{y}^{H}(k) \qquad (3)$$

where $f$ is a forgetting factor that is predetermined and has a value $0 \leq f \leq 1$, and the superscript H is a Hermitian operator.

Equation (1) can be written as follows:

$$\underline{\underline{R}}_{yy}\underline{w}=\lambda(\underline{\underline{R}}_{xx}^{D}+\underline{\underline{R}}_{xx}^{O})\underline{w} \qquad (4)$$

In equation (4), $\underline{\underline{R}}_{xx}^{D}$ is a matrix whose diagonal elements are identical to those of $\underline{\underline{R}}_{xx}$ and whose off-diagonal elements are zero, and $\underline{\underline{R}}_{xx}^{O}$ is a matrix whose diagonal elements are zero and whose off-diagonal elements are identical to those of $\underline{\underline{R}}_{xx}$.

Note that the number of elements of the vector $\underline{x}$ of the received signals obtained at the input of the despreading unit 103 is equal to or less than the number of antenna elements in the array antenna system. The number of the row or column elements of the autocovariance matrix $\underline{\underline{R}}_{xx}$ or $\underline{\underline{R}}_{yy}$ is equal to the number of elements of the vector $\underline{x}$ of the received signals. Equation (4) can be rewritten as follows:

$$\underline{\underline{R}}_{yy}\underline{w}-\lambda\underline{\underline{R}}_{xx}^{O}=\lambda\underline{\underline{R}}_{xx}^{D}\underline{w} \qquad (5)$$

From equation (5), the following equation can be found with the inverse matrix of $\underline{\underline{R}}_{xx}^{D}$:

$$(\underline{R}_{yy} - \lambda \underline{R}_{xx}^O)(\underline{R}_{xx}^D)^{-1} \underline{w} = \lambda \underline{w} \quad (6)$$

The inverse matrix of $\underline{R}_{xx}^D$ can be easily calculated, since $\underline{R}_{xx}^D$ is the diagonal matrix.

Exemplary, $\underline{R}_{xx}^D$ and its inverse matrix $(\underline{R}_{xx}^D)^{-1}$ can be expressed as follows:

$$\underline{R}_{xx}^D = \begin{bmatrix} D_1 & 0 & \cdots & 0 \\ 0 & D_2 & \cdots & 0 \\ \vdots & \vdots & \cdots & \vdots \\ & & \cdots & \\ 0 & 0 & \cdots & D_L \end{bmatrix} \quad (7)$$

$$(\underline{R}_{xx}^D)^{-1} = \begin{bmatrix} D_1^{-1} & 0 & \cdots & 0 \\ 0 & D_2^{-1} & \cdots & 0 \\ \vdots & \vdots & \cdots & \vdots \\ & & \cdots & \\ 0 & 0 & \cdots & D_L^{-1} \end{bmatrix} \quad (8)$$

From equation (6), the eigenvalue $\lambda$ is obtained as follows:

$$\lambda = \frac{\underline{w}^H \underline{R}_{yy} \underline{w}}{\underline{w}^H \underline{R}_{xx} \underline{w}} \quad \underline{R}_{yy} \quad \underline{R}_{xx} \underline{R}_{xx}^D \underline{R}_{xx}^O \quad (9)$$

Thus, the weight vector $\underline{w}$ can be expressed as follows:

$$\underline{w} = \frac{\left[ \underline{R}_{yy} (\underline{R}_{xx}^D)^{-1} - \lambda \underline{R}_{xx}^O (\underline{R}_{xx}^D)^{-1} \right] \underline{w}}{\lambda} \quad (10)$$

In equation (10), the number of elements of the weight vector $\underline{w}$ is equal to the number of rows or columns of the autocovariance matrix $\underline{R}_{xx}$ or $\underline{R}_{yy}$.

Since the weight vector $\underline{w}$ should be continuously updated and the signals are shortly inputted, equation 10 can be transposed as follows:

$$\underline{w}(k+1) = \frac{\left[ \underline{R}_{yy}(k)(\underline{R}_{xx}^D(k))^{-1} - \lambda \underline{R}_{xx}^O(k)(\underline{R}_{xx}^D(k))^{-1} \right] \underline{w}(k)}{\lambda}, \quad (11)$$

where k is a snapshot index to receive the signal vector and to update the weight vector.

Using equation (11), the weight vector is continuously updated so as to track the movement of the signal source and produce an optimal beam pattern for the signal source.

An array output z is calculated by taking the signal vector $\underline{y}$ and inner product from the weight vector $\underline{w}$ as follows:

$$z = \underline{w}^H \underline{y} \quad (12)$$

In the present invention, the beamforming method can be selectively implemented so as to minimize computation time or to minimize the occurrence of errors. Accordingly, equation (9) for calculating the maximum eigenvalue can be simplified without matrix operations as follows:

$$\lambda(k) = \frac{\lambda_{nom}(k)}{\lambda_{den}(k)}, \quad (13)$$

where nom denotes numerator and den represents denominator.

In equation (13), $\lambda_{nom}(k)$ can be expressed as follows:

$$\begin{aligned} \lambda_{nom}(k) &= \underline{w}^H(k) \underline{R}_{xx}(k) \underline{w}(k) \\ &= \underline{w}^H(k) \left[ f \underline{R}_{yy}(k-1) + \underline{y}(k) \underline{y}(k)^H \right] \underline{w}(k) \\ &= f \underline{w}^H(k) \underline{R}_{yy}(k-1) \underline{w}(k) + \underline{w}^H(k) \underline{y}(k) \underline{y}^H(k) \underline{w}(k) \\ &\approx f \underline{w}^H(k-1) \underline{R}_{yy}(k-1) \underline{w}(k-1) + \underline{w}^H(k) \underline{y}(k) \underline{y}^H(k) \underline{w}(k) \end{aligned} \quad (14)$$

Note the snapshot cycle for updating the weight vector is very short such that $\underline{w}(k) \approx \underline{w}(k-1)$ is assumed.

Here, if $\underline{y}^H(k) \underline{w}(k)$ is given as $\alpha(k)$, equation (14) can be expressed as follows:

$$\lambda_{nom}(k) = f \lambda_{nom}(k-1) + |\alpha(k)|^2 \quad (15)$$

In the same manner, $\lambda_{den}(k)$ can be expressed as follows:

$$\lambda_{den}(k) = f \lambda_{den}(k-1) + |\beta(k)|^2 \quad (16)$$

where $\beta(k)$ is given for $\underline{x}^H(k) \underline{w}(k)$.

How to simplify the beamforming algorithm using equation (13) will be described hereinafter.

Equation 11 can be rewritten as the following equation (17), since $\underline{R}_{xx}^O$ is identical to $\underline{R}_{xx}(k) - \underline{R}_{xx}^D(k)$:

$$\underline{w}(k+1) = \underline{w}(k) + \frac{\left[ \underline{R}_{xx}^D(k) \right]^{-1} \left[ \underline{R}_{yy}(k) - \lambda(k) \underline{R}_{xx}(k) \right] \underline{w}(k)}{\lambda(k)} \quad (17)$$

From equation 17, $$\frac{\left[ \underline{R}_{xx}^D(k) \right]^{-1} \left[ \underline{R}_{yy}(k) - \lambda(k) \underline{R}_{xx}(k) \right] \underline{w}(k)}{\lambda(k)}$$

is given as $\underline{o}(k)$ as follows:

$$\underline{o}(k) = \frac{\left[ \underline{R}_{xx}^D(k) \right]^{-1} \left[ \underline{R}_{yy}(k) - \lambda(k) \underline{R}_{xx}(k) \right] \underline{w}(k)}{\lambda(k)} \quad (18)$$

Equation (18) can be developed as follows:

$$\begin{aligned} \underline{o}(k) &= \frac{\left[ \underline{R}_{xx}^D(k) \right]^{-1}}{\lambda(k)} \left[ \underline{R}_{yy}(k) - \lambda(k) \underline{R}_{xx}(k) \right] \underline{w}(k) \\ &= \frac{\left[ \underline{R}_{xx}^D(k) \right]^{-1}}{\lambda(k)} \left[ f \underline{R}_{yy}(k-1) + \underline{y}(k) \underline{y}^H(k) - \lambda(k) \left[ f \underline{R}_{xx}(k-1) + \underline{x}(k) \underline{x}^H(k) \right] \right] \underline{w}(k) \end{aligned} \quad (19)$$

-continued $$= [\underline{\underline{R}}_{xx}^D(k)]^{-1} \left[ \frac{1}{\lambda(k)} \left[ f\underline{\underline{R}}_{yy}(k-1)\underline{w}(k) + \underline{y}(k)\underline{y}^H(k)\underline{w}(k) \right] - f\underline{\underline{R}}_{xx}(k-1)\underline{w}(k) - \underline{x}(k)\underline{x}^H(k)\underline{w}(k) \right]$$

From equation (19), if $f R_{yy}(k-1)\underline{w}(k)+\underline{y}(k)\underline{y}^H(k)\underline{w}(k)$ is given as $\underline{v}(k)$, $\underline{v}(k)$ can be developed as follows:

$$\underline{v}(k) = f\underline{\underline{R}}_{yy}(k-1)\underline{w}(k) + \underline{y}(k)\underline{y}^H(k)\underline{w}(k) \quad (20)$$

$$\approx f\underline{\underline{R}}_{yy}(k-1)\underline{w}(k-1) + \underline{y}(k)\underline{y}^H(k)\underline{w}(k)$$

$$\approx f\underline{v}(k-1) + \alpha(k)\underline{y}(k)$$

The initial value of $\underline{v}(k)$ can be expressed as follows.

$$\underline{v}(0)=\alpha(0)\underline{y}(0) \quad (21)$$

In the same manner, $f R_{xx}(k-1)\underline{w}(k)+\underline{x}(k)\underline{x}^H(k)\underline{w}(k)$ is given as $\underline{q}(k)$, $\underline{q}(k)$ can be developed as follows:

$$\underline{q}(k) = f\underline{\underline{R}}_{xx}(k-1)\underline{w}(k) + \underline{x}(k)\underline{x}^H(k)\underline{w}(k) \quad (22)$$

$$\approx f\underline{q}(k-1) + \beta(k)\underline{x}(k)$$

The initial value of $\underline{q}(k)$ can be expressed as follows:

$$\underline{q}(0)=\beta(0)\underline{x}(0) \quad (23)$$

From equations (20) and (22), equation (19) can be simplified as the following equation (24):

$$\underline{o}(k) = [\underline{\underline{R}}_{xx}^D(k)]^{-1} \left[ \frac{1}{\lambda(k)} \underline{v}(k) - \underline{q}(k) \right] \quad (24)$$

It is noted that equation (24) is simpler than equation (19), even though the matrix operation $[R_{xx}^D(k)]^{-1}$ remains. This is because, since the matrix operation $[R_{xx}^D(k)]^{-1}$ is the inverse matrix of the diagonal matrix, the computation requirements of this matrix operation is actually equal to that of a vector equation. That is, the total amount of the required computation for obtaining the weight vector is simplified by omitting the matrix operations.

Figure 2:
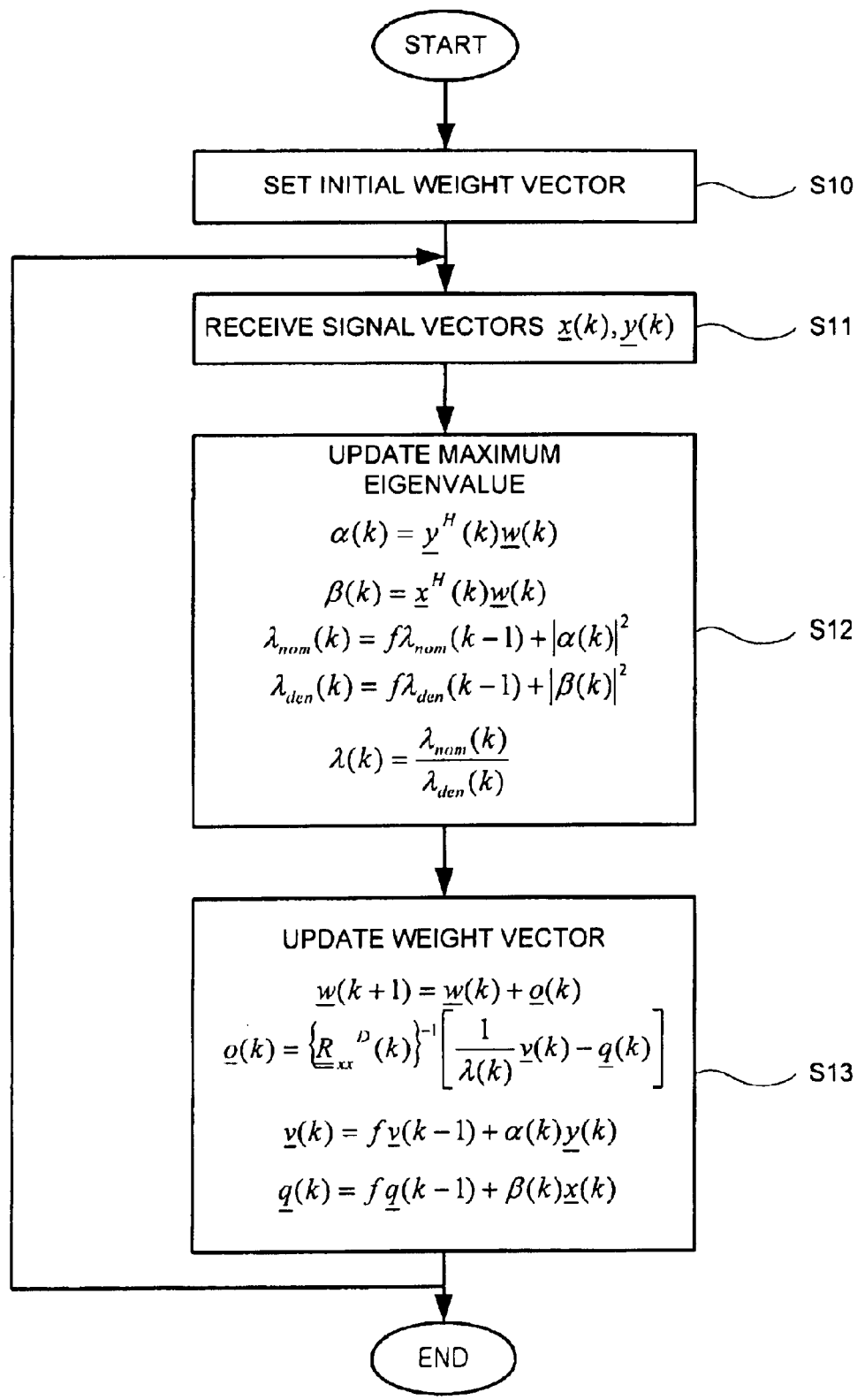
FIG. 2 is a flowchart illustrating an adaptive beamforming method according to a first preferred embodiment of the present invention.

FIG. 2 is a flowchart simply illustrating the above-explained adaptive beamforming method, according to the first embodiment of the present invention.

As shown in FIG. 2, the beamformer 107 sets the initial guess as $\underline{v}(0)=\alpha(0)\underline{y}(0)$ and $\underline{q}(0)=\beta(0)\underline{x}(0)$ at step S10. If the signals $\underline{x}$ and $\underline{y}$ are received from the input and output of the despreading unit 103, the beamformer 107 generates signal vectors $\underline{x}(k)$ and $\underline{y}(k)$, respectively, at step S11, and updates the generalized eigenvalue by updating the numerator and denominator of the eigenvalue with respective $\underline{y}^H(k)\underline{w}(k)(=\alpha(k))$ and $\underline{x}^H(k)\underline{w}(k)(=\beta(k))$ derived from the signal vectors $\underline{x}(k)$ and $\underline{y}(k)$ at step S12. The updated numerator and denominator are presented as equations (15) and (16).

Sequentially, the beamformer 107 updates the weight vector using the updated eigenvalue at step S13. Here, the weight vector update is performed by reflecting the component $\underline{o}(k)$, defined as equation (24), to the weight vector at the present snapshot. $\underline{o}(k)$ can be obtained using the diagonal elements of the autocovariance matrix of the received signal vector, the updated eigenvalue, and $\underline{v}(k)$ and $\underline{q}(k)$ updated from their respective initial values of $\underline{v}(0)=\alpha(0)\underline{y}(0)$ and $\underline{q}(0)=\beta(0)\underline{x}(0)$. In other words, $\underline{o}(k)$ is calculated using $\underline{v}(k-1)$ and $\underline{q}(k-1)$ obtained at the previous snapshot, and $\alpha(k)\underline{y}(k)$ and $\beta(k)\underline{x}(k)$ obtained at the present snapshot.

Second Preferred Embodiment

Figure 3:
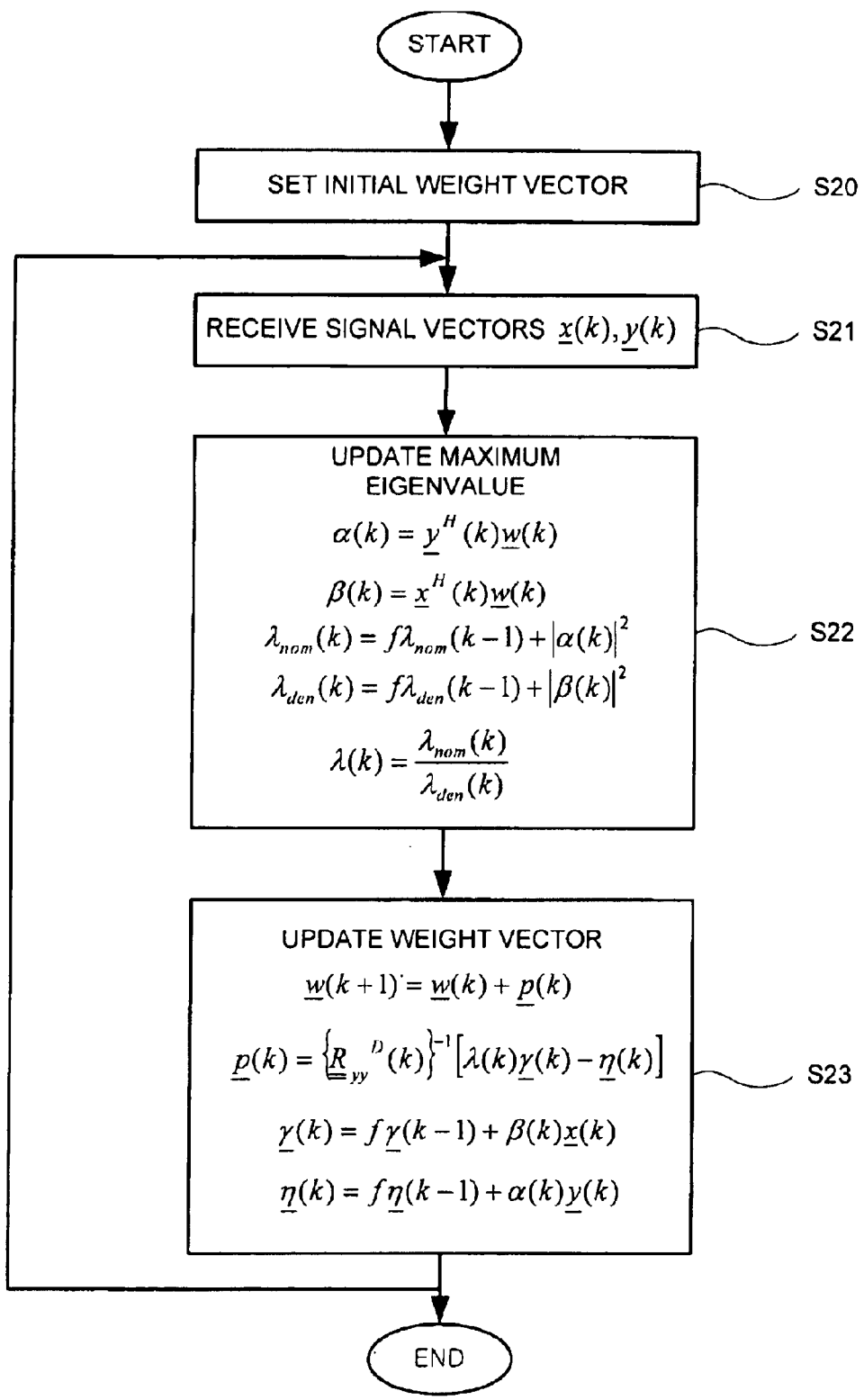
FIG. 3 is a flowchart illustrating an adaptive beamforming method according to a second preferred embodiment of the present invention.

FIG. 3 is a flowchart illustrating an adaptive beamforming method, according to another preferred embodiment of the present invention.

In this embodiment, the weight vector is calculated using $R_{yy}^D$ whose diagonal elements are identical to those of $R_{yy}$ and whose off-diagonal elements are zero, and $R_{yy}^O$ whose diagonal elements are zero and whose off-diagonal elements are identical to those of $R_{yy}$.

Accordingly, equation (1) can be written as follows:

$$(\underline{\underline{R}}_{yy}^D + \underline{\underline{R}}_{yy}^O)\underline{w} = \lambda \underline{\underline{R}}_{xx}\underline{w} \quad (25)$$

Note that the number of elements of the vector $\underline{x}$ of the received signals obtained at the input of the despreading unit 103 is equal to or less than the number of antenna elements in the array antenna system. The number of the row or column elements of the autocovariance matrixes $R_{xx}$ or $R_{yy}$ is equal to the number of elements of the vector $\underline{x}$ of the received signals.

Equation (25) can be rewritten as follows:

$$(\underline{\underline{R}}_{yy}^D\underline{w}) = \lambda \underline{\underline{R}}_{xx}\underline{w} - \underline{\underline{R}}_{yy}\underline{w} \quad (26)$$

From equation (26), the weight vector can be expressed as follows with the inverse matrix of $R_{yy}^D$:

$$\underline{w} = (\lambda \underline{\underline{R}}_{xx}\underline{w} - \underline{\underline{R}}_{yy}^O\underline{w})(\underline{\underline{R}}_{yy}^D)^{-1} \quad (27)$$

where the generalized eigenvalue $\lambda$ can be obtained by equation (9) as in the first embodiment. In equation (27), the number of elements of the weight vector $\underline{w}$ is equal to the number of rows or columns of the autocovariance matrix ($R_{xx}$ or $R_{yy}$).

The weight vector, updated using the eigenvalue obtained from equations (9) and (27), can be expressed as follows:

$$\underline{w}(k+1) = (\underline{\underline{R}}_{yy}^D(k))^{-1}[\lambda \underline{\underline{R}}_{xx}(k)\underline{w}(k) - \underline{\underline{R}}_{yy}^O(k)\underline{w}(k)] \quad (28)$$

Equation (28) can be rewritten as follows without matrix operations:

$$\underline{w}(k+1) = \underline{w}(k) + [\underline{\underline{R}}_{yy}^D(k)]^{-1}[\lambda(k)\underline{\underline{R}}_{xx}(k) - \underline{\underline{R}}_{yy}(k)]\underline{w}(k) \quad (29)$$

If $[R_{yy}^D(k)]^{-1}[\lambda(k)R_{xx}(k) - R_{yy}(k)]\underline{w}(k)$ is taken as $\underline{p}(k)$, equation (29) can be expressed as follows:

$$\underline{w}(k-1) = \underline{w}(k) + \underline{p}(k) \quad (30)$$

Accordingly, equation (30) can be developed as follows:

$$\underline{p}(k) = \left[\underline{\underline{R}}_{yy}^D(k)\right]^{-1} \left[\lambda(k)\underline{\underline{R}}_{xx}(k) - \underline{\underline{R}}_{yy}(k)\right]\underline{w}(k) \quad (31)$$

$$= \left[\underline{\underline{R}}_{yy}^D(k)\right]^{-1} \left[\lambda(k)[f\underline{\underline{R}}_{xx}(k-1) + \underline{x}(k)\underline{x}^H(k)] - f\underline{\underline{R}}_{yy}(k-1) - \underline{y}(k)\underline{y}^H(k)\right]\underline{w}(k)$$

$$= \left[\underline{\underline{R}}_{yy}^D(k)\right]^{-1} \left[\lambda(k)[f\underline{\underline{R}}_{xx}(k-1)\underline{w}(k) + \underline{x}(k)\underline{x}^H(k)\underline{w}(k)] - f\underline{\underline{R}}_{yy}(k-1)\underline{w}(k) - \underline{y}(k)\underline{y}^H(k)\underline{w}(k)\right]$$

If $f\underline{\underline{R}}_{xx}(k-1)\underline{w}(k) + \underline{x}(k)\underline{x}^H(k)\underline{w}(k)$ is given as $\underline{\gamma}(k)$, then $\underline{\gamma}(k)$ can be developed as follows:

$$\underline{\gamma}(k) = f\underline{\underline{R}}_{xx}(k-1)\underline{w}(k) + \underline{x}(k)\underline{x}^H(k)\underline{w}(k) \quad (32)$$

$$\approx f\underline{\underline{R}}_{xx}(k-1)\underline{w}(k-1) + \underline{x}(k)\underline{x}^H(k)\underline{w}(k)$$

$$\approx f\underline{\gamma}(k-1) + \beta(k)\underline{x}(k)$$

where $\beta(k)$ represents $\underline{x}^H(k)\underline{w}(k)$.

From equation (32), the initial value of $\underline{\gamma}(k)$ can be expressed as follows:

$$\underline{\gamma}(0) = \beta(0)\underline{x}(0) \quad (33)$$

In the same manner, $f\underline{\underline{R}}_{yy}(k-1)\underline{w}(k) + \underline{y}(k)\underline{y}^H(k)\underline{w}(k)$ is given as $\underline{\eta}(k)$, and $\underline{\eta}(k)$ can be developed as follows:

$$\underline{\eta}(k) = f\underline{\underline{R}}_{yy}(k-1)\underline{w}(k) + \underline{y}(k)\underline{y}^H(k)\underline{w}(k) \quad (34)$$

$$\approx f\underline{\eta}(k-1) + \alpha(k)\underline{y}(k)$$

From equation (34), the initial value of $\underline{\eta}(k)$ can be expressed as follows:

$$\underline{\eta}(0) = \alpha(0)\underline{y}(0) \quad (35)$$

From equations (32) and (34), equation (31) can be rewritten as follows:

$$\underline{p}(k) = [\underline{\underline{R}}_{yy}^D(k)]^{-1}[\lambda(k)\underline{\gamma}(k) - \underline{\eta}(k)] \quad (36)$$

It is note that equation (36) is simplified in comparison with equation (29) even though the matrix operation $[R_{yy}^D(k)]^{-1}$ is remained. However, since the matrix operation $[\underline{\underline{R}}_{yy}^D(k)]^{-1}$ is of the inverse matrix of the diagonal matrix such that the computation amount of the matrix operation becomes equal to the equivalent vector equation. That is, the total amount of the required computation for obtaining the weight vector is simplified by omitting the matrix operations.

It is noted that equation (24) is simpler than equation (19), even though the matrix operation $[R_{xx}^D(k)]^{-1}$ remains. This is because, since the matrix operation $[R_{xx}^D(k)]^{-1}$ is of the inverse matrix of the diagonal matrix, the computation requirements of this matrix operation is actually equal to that of a vector equation. That is, the total amount of the required computation for obtaining the weight vector is simplified by omitting the matrix operations.

FIG. 3 is a flowchart simply illustrating the above-explained adaptive beamforming method, according to the second embodiment of the present invention.

As shown in FIG. 3, the beamformer 107 sets the initial guess as $\eta(0) = \alpha(0)\underline{y}(0)$ and $\underline{\gamma}(0) = \beta(0)\underline{y}(0)$ at step S20. If the signals $\underline{x}$ and $\underline{y}$ are received from the input and output of the despreading unit 103, the beamformer 107 generates signal vectors $\underline{x}(k)$ and $\underline{y}(k)$, respectively, at step S21, and updates the eigenvalue by updating the numerator and denominator of the eigenvalue with respective $\underline{y}^H(k)\underline{w}(k)(=\alpha(k))$ and $\underline{x}^H(k)\underline{w}(k)(=\beta(k))$ derived from the signal vectors $\underline{x}(k)$ and $\underline{y}(k)$ at step S22. The updated numerator and denominator are presented as equations (15) and (16).

Continuously, the beamformer 107 updates the weight vector using the updated eigenvalue at step S23. Here, the weight vector update is performed by reflecting the component $\underline{p}(k)$, defined as equation (36), to the weight vector at the present snapshot. $\underline{p}(k)$ can be obtained using the diagonal elements of the autocovariance matrix of the received signal vector, the updated eigenvalue, and $\underline{\eta}(k)$ and $\underline{\gamma}(k)$ updated from their respective initial values of $\underline{\eta}(0) = \alpha(0)\underline{y}(0)$ and $\underline{\gamma}(0) = \beta(0)\underline{x}(0)$. In other words, $\underline{p}(k)$ is calculated using $\underline{\eta}(k-1)$ and $\underline{\gamma}(k-1)$ obtained at the previous snapshot, and $\alpha(k)\underline{y}(k)$ and $\beta(k)\underline{x}(k)$ obtained at the present snapshot.

As described above, in the adaptive beamforming method of the present invention the total amount of the computation is dramatically decreased by omitting the complex matrix operations such that it is possible to reduce weight vector calculation time so as to form the beam pattern for array antenna system in real time.

Also, the simplification of the beamforming algorithm makes possible to reduce the number of the DSPs for the beamformer, resulting in reduction of whole manufacturing costs of the beamformer.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for updating a weight vector for input signals from a plurality of antennas of a wireless communication system, comprising:

setting an initial weight vector for weighting the input signals;

separating desired signals from the input signals;

obtaining auto-covariance matrixes of the separated desired signals and the input signals, respectively;

computing an eigenvalue that maximizes a ratio of a vector that is a multiplication of the auto-covariance matrix of the separated desired signals and the initial weight vector over a vector that is a multiplication of the auto-covariance matrix of the input signals and the initial weight vector;

generating a new weight vector by adding a vector to the initial weight vector, wherein said added vector is proportional to the multiplication of the inverse of a diagonal matrix of the auto-covariance matrix of the input signals and a vector made from the multiplication of a vector of the separated desired signals and the initial weight vector and the inverse of the eigenvalue.

2. The method of claim 1, wherein said added vector is calculated by the steps of:
generating a first vector which is a multiplication of the Hermitian of a vector of the separated desired signals, the initial weight vector, and a vector of the separated desired signals added to the previous first vector multiplied by a forgetting factor;
generating a second vector which is a multiplication of the Hermitian of a vector of the input signals, the initial weight vector, and a vector of the input signals added to the previous first vector multiplied by a forgetting factor; calculating said added vector by,
(1) dividing said first vector with said eigenvalue,
(2) subtracting said second vector from the divided first vector, and
(3) multiplying the result of step (2) by the inverse of a diagonal matrix of the auto-covariance matrix of the input signals.

3. The method of claim 2, wherein said forgetting factor is predetermined in a transmission interval and has a value from zero to one.

4. The method of claim 3, wherein said first vector is $\underline{v}(k)$, wherein:

$$\underline{v}(k) = f\underline{R}_{yy}(k-1)\underline{w}(k) + \underline{y}(k)\underline{y}^H(k)\underline{w}(k) \text{ or,}$$
$$\approx f\underline{R}_{yy}(k-1)\underline{w}(k-1) + \underline{y}(k)\underline{y}^H(k)\underline{w}(k) \text{ or,}$$
$$\approx f\underline{v}(k-1) + \alpha(k)\underline{y}(k)$$

and said second vector is $\underline{q}(k)$, wherein:

$$\underline{q}(k) = f\underline{R}_{xx}(k-1)\underline{w}(k) + \underline{x}(k)\underline{x}^H(k)\underline{w}(k) \text{ or,}$$
$$\approx f\underline{q}(k-1) + \beta(k)\underline{x}(k).$$

5. The method of claim 4, wherein said added vector is $\underline{o}(k)$, said inverse of a diagonal matrix of the auto-covariance matrix of the input signals is $[R_{xx}^D(k)]^{-1}$, and said eigenvalue is $\lambda(k)$, wherein:

$$\underline{o}(k)\{\underline{R}_{xx}^D(k)\}^{-1}\left[\frac{1}{\lambda(k)}\underline{v}(k) - \underline{q}(k)\right].$$

6. The method of claim 1, wherein said desired signals are signals despread with a predetermined code from the input signals.

7. A method for updating the weight vector for input signals from a plurality of antennas of a wireless communication system, comprising:
setting an initial weight vector for weighting the input signals;
separating desired signals from the input signals;
obtaining auto-covariance matrixes of the separated desired signals and the input signals, respectively;
computing an eigenvalue that maximizes a ratio of a vector that is a multiplication of the auto-covariance matrix of the separated desired signals and the initial weight vector over a vector that is a multiplication of the auto-covariance matrix of the input signals and the initial weight vector;
generating a new weight vector by adding a vector to the initial weight vector, wherein said added vector is proportional to the multiplication of the inverse of a diagonal matrix of the auto-covariance matrix of the separated desired signals and a vector made from the multiplication of a vector of the input signals and the initial weight vector and the eigenvalue.

8. The method of claim 7, wherein said added vector is calculated by the steps of:
generating a first vector which is a multiplication of the Hermitian of a vector of the separated desired signals, the initial weight vector, and a vector of the separated desired signals added to the previous first vector multiplied by a forgetting factor;
generating second vector which is a multiplication of the Hermitian of a vector of the input signals, the initial weight vector, and a vector of the input signals added to the previous first vector multiplied by a forgetting factor;
calculating said added vector by,
(1) multiplying said second vector with said eigenvalue,
(2) subtracting said first vector from the multiplied first vector, and
(3) multiplying the result of step (2) by the inverse of a diagonal matrix of the auto-covariance matrix of the separated desired signals.

9. The method of claim 8, wherein said forgetting factor is predetermined in a transmission interval and has a value from zero to one.

10. The method of claim 9, wherein said second vector is $\underline{\gamma}(k)$, wherein:

$$\underline{\gamma}(k) = f\underline{R}_{xx}(k-1)\underline{w}(k) + \underline{x}(k)\underline{x}^H(k)\underline{w}(k) \text{ or,}$$
$$\approx f\underline{\gamma}(k-1) + \beta(k)\underline{x}(k)$$

and said first vector is $\underline{\eta}(k)$, wherein:

$$\underline{\eta}(k) = f\underline{R}_{yy}(k-1)\underline{w}(k) + \underline{y}(k)\underline{y}^H(k)\underline{w}(k) \text{ or,}$$
$$\approx f\underline{\eta}(k-1) + \alpha(k)\underline{y}(k)$$

11. The method of claim 10, wherein said added vector is $\underline{p}(k)$, said inverse of a diagonal matrix of the auto-covariance matrix of the separated desired signals is $[R_{yy}^D(k)]^{-1}$, and said eigenvalue is $\lambda(k)$, wherein:

$$\underline{p}(k)=[\underline{R}_{yy}^D(k)]^{-1}[\lambda(k)\underline{\gamma}(k)-\underline{\eta}(k)].$$

12. The method of claim 7, wherein said desired signals are signals despread with a predetermined code from the input signals.

13. A method for updating a maximum eigenvalue for generating a weight vector for weighting input signals from a plurality of antennas of a wireless communication system, comprising:
setting an initial weight vector for weighting the input signals;
separating desired signals from the input signals;
generating a first value by multiplying the Hermitian of a vector of the separated desired signals and the weight vector;
generating a second value by multiplying the Hermitian of a vector of the input signals;
computing a numerator of a new maximum eigenvalue by adding a square of said first value to a portion of a numerator of a previous maximum eigenvalue;

computing a denominator of the new maximum eigenvalue by adding a square of said second value to a portion of a denominator of the previous maximum eigenvalue; and replacing the previous maximum eigenvalue with the new maximum eigenvalue having said numerator and denominator, wherein said first value $\alpha(k)$ is calculated in accordance with the following equation: $\alpha(k)=\underline{y}^H(k)\underline{w}(k)$, and wherein said second value $\beta(k)$ is calculated in accordance with the following equation $\beta(k)=\underline{x}^H(k)\underline{w}(k)$, and wherein said numerator is calculated in accordance with the following equation $\lambda(k)=f\lambda_{nom}(k-1)+|\alpha(k)|^2$ and, said denominator is calculated in accordance with the following equation, $\lambda_{den}(k)=f\lambda_{den}(k-1)+|\beta(k)|^2$, wherein $f$ is a forgetting factor that is predetermined in a transmission interval and has a value from zero to one.

14. The method of claim 13, wherein said desired signals are signals despread with a predetermined code from the input signals.

15. An adaptive beam forming method for a communication receiver that inputs signals from an antenna array, comprising:

separating desired signals from the input signals;

calculating a maximum eigenvalue as a ratio of a numerator and a denominator;

calculating a weight vector using said maximum eigenvalue, said desired signals, and said input signals; and weighting signals from or to a plurality antennas in said antenna array with the weight vector, wherein the maximum eigenvalue $\lambda(k)$ at a present snapshot is computed in accordance with following equation:

$$\lambda(k) = \frac{\lambda_{nom}(k)}{\lambda_{den}(k)}$$

where nom denotes numerator and den denotes denominator, $\lambda_{nom}(k)=f\lambda_{nom}(k-1)+|\alpha(k)|^2$, and $\lambda_{den}(k)=f\lambda_{den}(k-1)+|\beta(k)|^2$, and k is a snapshot index to receive a signal vector and to update the weight vector.

16. The adaptive beamforming method of claim 15, wherein $\alpha(k)$ and $\beta(k)$ are obtained in accordance with the following equations: $\alpha(k)=\underline{y}^H(k)\underline{w}(k)$, and $\beta(k)=\underline{x}^H(k)\underline{w}(k)$, where $\underline{w}$ is a weight vector, $\underline{y}(k)$ is a vector of the separated desired signals, $\underline{x}(k)$ is a vector of the input signals, and H is a Hermitian operator.

17. The adaptive beamforming method of claim 16, wherein the weight vector is updated in accordance with the following equation: $\underline{w}(k+1)=\underline{w}(k)+\underline{o}(k)$ where $$\underline{o}(k) = \left[\underline{R}_{xx}^D(k)\right]^{-1}\left[\frac{1}{\lambda(k)}\underline{v}(k) - \underline{q}(k)\right],$$

and $[R_{xx}^D(k)]^{-1}$ is an inverse of a diagonal matrix of the auto-covariance matrix of the input signals.

18. The adaptive beamforming method of claim 17, wherein $\underline{v}(k)$ is obtained in accordance with the following equation:

$$\underline{v}(k) = f\underline{R}_{yy}(k-1)\underline{w}(k) + \underline{y}(k)\underline{y}^H(k)\underline{w}(k)$$

$$\approx f\underline{R}_{yy}(k-1)\underline{w}(k-1) + \underline{y}(k)\underline{y}^H(k)\underline{w}(k)$$

$$\approx f\underline{v}(k-1) + \alpha(k)\underline{y}(k).$$

and, $\underline{q}(k)$ is obtained in accordance with the following equation:

$$\underline{q}(k) = f\underline{R}_{xx}(k-1)\underline{w}(k) + \underline{x}(k)\underline{x}^H(k)\underline{w}(k)$$

$$\approx f\underline{q}(k-1) + \beta(k)\underline{x}(k).$$

19. The adaptive beamforming method of claim 18, wherein $\underline{q}(k)$ is obtained in accordance with the following equation:

$$\underline{q}(k) = f\underline{R}_{xx}(k-1)\underline{w}(k) + \underline{x}(k)\underline{x}^H(k)\underline{w}(k)$$

$$\approx f\underline{q}(k-1) + \beta(k)\underline{x}(k).$$

20. The adaptive beamforming method of claim 16, wherein the weight vector $\underline{w}$ is updated in accordance with the following equation: $\underline{w}(k+1)=\underline{w}(k)+\underline{p}(k)$, where $\underline{p}(k)=[R_{yy}^D(k)]^{-1}[\lambda(k)\underline{y}(k)-\underline{\eta}(k)]$, and where $[R_{yy}^D(k)]^{-1}$ is an inverse of a diagonal matrix of the auto-covariance matrix of the separated desired signals.

21. The adaptive beamforming method of claim 20, wherein $\lambda(k)$ is obtained in accordance with the following equation:

$$\underline{\gamma}(k) = f\underline{R}_{xx}(k-1)\underline{w}(k) + \underline{x}(k)\underline{x}^H(k)\underline{w}(k)$$

$$\approx f\underline{\gamma}(k-1) + \beta(k)\underline{x}(k), \text{ and}$$

$\underline{\eta}(k)$ is obtained in accordance with the following equation:

$$\underline{\eta}(k) = f\underline{R}_{yy}(k-1)\underline{w}(k) + \underline{y}(k)\underline{y}^H(k)\underline{w}(k)$$

$$\approx f\underline{\eta}(k-1) + \alpha(k)\underline{y}(k).$$

22. The method of claim 15, wherein said desired signals are signals despread with a predetermined code from the input signals.

23. A method of updating a weight vector for weighting input signals from a plurality of antennas, comprising:

setting an initial weight vector for weighting the input signals;

separating desired signals from the input signals;

deriving an auto-covariance matrix of the separated desired signals;

deriving an auto-covariance matrix of the input signals;

deriving an eigenvalue using the auto-covariance matrix of the separated desired signals, the auto-covariance matrix of the input signals and the initial weight vector; and deriving a new weight vector by adding a vector to the initial weight vector, wherein the added vector is based on a vector of the separated signals, a vector of the input signals, the initial weight value, the maximum eigenvalue, and one of the auto-covariance matrix of the input signals and the auto-covariance matrix of the separated desired signals, and wherein the added vector is proportional to the product of: (1) the inverse of a diagonal matrix of the auto-covariance matrix of the input signals; and (2) a vector derived from the product of a vector of the separated desired signals, the initial weight vector, and the inverse of the maximum eigenvalue.

24. The method of claim 23, wherein the maximum eigenvalue comprises an eigenvalue that maximizes a ratio of a first value to a second value, wherein the first value is defined by a vector that is the product of the auto-covariance matrix of the separated desired signals and the initial weight vector, and the second value is defined by a vector that is the product of the auto-covariance matrix of the input signals and the initial weight vector.

25. A method of updating a weight vector for weighting input signals from a plurality of antennas, comprising setting an initial weight vector for weighting the input signals;

separating desired signals from the input signals;

deriving an auto-covariance matrix of the separated desired signals;

deriving an auto-covariance matrix of the input signals;

deriving an eigenvalue using the auto-covariance matrix of the separated desired signals, the auto-covariance matrix of the input signals and the initial weight vector;

deriving a new weight vector by adding a vector to the initial weight vector, wherein the added vector is based on a vector of the separated signals, a vector of the input signals, the initial weight value, the maximum eigenvalue, and one of the auto-covariance matrix of the input signals and the auto-covariance matrix of the separated desired signals, and wherein the added vector is proportional to the product of: (1) the inverse of a diagonal matrix of the auto-covariance matrix of the separated desired signals; and (2) a vector derived from the product of a vector of the input signals, the initial weight vector, and the inverse of the maximum eigenvalue.

* * * * *